United States Patent
Hicks

(10) Patent No.: US 8,151,117 B2
(45) Date of Patent: Apr. 3, 2012

(54) DETECTION OF ITEMS STORED IN A COMPUTER SYSTEM

(75) Inventor: Richard Middleton Hicks, Malvern (GB)

(73) Assignee: VocalComm Group, LLC, Wilmington, DE (US)

( * ) Notice: Subject to any disclaimer, the term of this patent is extended or adjusted under 35 U.S.C. 154(b) by 1738 days.

(21) Appl. No.: 10/577,660

(22) PCT Filed: Oct. 25, 2004

(86) PCT No.: PCT/GB2004/004510
§ 371 (c)(1), (2), (4) Date: May 1, 2006

(87) PCT Pub. No.: WO2005/052767
PCT Pub. Date: Jun. 9, 2005

(65) Prior Publication Data
US 2007/0074026 A1    Mar. 29, 2007

(30) Foreign Application Priority Data

Nov. 5, 2003  (GB) .................................. 0325767.2
Jun. 10, 2004 (GB) .................................. 0412917.7

(51) Int. Cl.
*G06F 11/30* (2006.01)
(52) U.S. Cl. ........... 713/187; 713/188; 713/193; 726/24
(58) Field of Classification Search ................ 713/187, 713/188, 193; 726/24
See application file for complete search history.

(56) References Cited

U.S. PATENT DOCUMENTS

| | | | |
|---|---|---|---|
| 5,440,723 A | 8/1995 | Arnold et al. | |
| 5,452,442 A | 9/1995 | Kephart | |
| 5,649,095 A | 7/1997 | Cozza | |
| 5,892,904 A * | 4/1999 | Atkinson et al. | 726/22 |
| 6,694,434 B1 * | 2/2004 | McGee et al. | 713/189 |
| 7,003,672 B2 * | 2/2006 | Angelo et al. | 713/189 |

(Continued)

FOREIGN PATENT DOCUMENTS

EP    0896285    2/1999

(Continued)

OTHER PUBLICATIONS

Pierre Richer, "Steganalysis: Detecting Hidden Information with computer forensic analysis", 2003; Retrieved from Internet: http://www.giac.org.practical/GSEC/Pierre_Richer_GSEC.pdf., pp. 1-11.

(Continued)

*Primary Examiner* — Eleni Shiferaw
*Assistant Examiner* — Paul Callahan
(74) *Attorney, Agent, or Firm* — Stolowitz Ford Cowger LLP

(57) ABSTRACT

Detection of items stored in a computer system such as computer code, data or information includes obtaining signatures characteristic of programs of interest such as steganographic programs. A signature is obtained by reading code from a program of interest. The code may consist of the first 500 bytes from a .DLL file taken from the programs' core steganographic kernel. This code is then the signature. The computer system compares the signature with files it holds, other than files on a prearranged exclusion list. If a signature is found to match data in a file, the filename, the finding of steganography in it, the file location and the matched signature are recorded by the computer system for output to its user.

31 Claims, 2 Drawing Sheets

U.S. PATENT DOCUMENTS

| | | | | |
|---|---|---|---|---|
| 7,526,654 B2 * | 4/2009 | Charbonneau | ............. | 713/188 |
| 2002/0138554 A1 * | 9/2002 | Feigen et al. | ............. | 709/203 |
| 2003/0023865 A1 | 1/2003 | Cowie et al. | | |
| 2003/0212913 A1 * | 11/2003 | Vella | ............. | 713/202 |
| 2007/0043957 A1 * | 2/2007 | Benoit et al. | ............. | 713/193 |

FOREIGN PATENT DOCUMENTS

| | | |
|---|---|---|
| GB | 2 383 444 | 6/2003 |
| WO | WO 98/30957 | 7/1998 |
| WO | WO 02/103533 | 12/2002 |

OTHER PUBLICATIONS

Toni Borders, "Steganography Policies for Protecting Your Web Site" Dec. 2002, Retrieved from Internet: http://www.giac.org/practical/ GSEC/Toni_Borders_GSEC.pdf., pp. 1-15.

Declan Mcullagh, "Secret Messages Come in Wavs", Wired News, Feb. 2001, Retrieved from Internet: http://www.wired.com/news/ politics/0,1283,41861,00.html.

* cited by examiner

DETECTION OF ITEMS STORED IN A COMPUTER SYSTEM

BACKGROUND OF THE INVENTION (1) Field of the Invention

This invention relates to detection of items stored in a computer system, and particularly, but not exclusively, to detection of unwanted items introduced by steganography.

(2) Description of the Art

Steganography may be defined as the covert concealment of information in the form of unwanted computer code within data on a carrier file such as an image file. The intention is that the existence of such information cannot be detected without some further information which is secret. Steganography is different to Cryptography. Cryptography can be described as being concerned with encrypting information so that an attacker cannot decipher it without some secret knowledge that it is hoped the attacker does not possess. Cryptography is therefore not necessarily concerned with secrecy regarding the existence of a message.

Steganography will normally be implemented with a large carrier file, so that only relatively minor perturbations are created in the carrier file by the introduction of secret information. These perturbations are small compared with the carrier documents apparent randomness. Many existing designers of steganographic systems use image files because of their large size. Known techniques include changing the least significant bit (LSB) of bitmap files or changing the LSB of some coefficients of JPEG files.

LSB changes are insignificant to human eyes, and so visual inspection will fail to detect steganographic information if the steganographic process is well designed.

However, LSBs are not truly random and they should show some statistical properties. Conceptually, a designer of a steganographic process may adopt some defensive techniques to avoid detection. The designer may compress data for input to the steganographic process, which tends to decrease the size of data to be hidden using steganographic techniques. Alternatively, the designer can encrypt the data, which will tend to remove any pattern from it. Additionally, if a user only desires to hide a small amount of data, the steganographic process can be designed so that hidden data perturbs only a few bits of a carrier file in which it is inserted. A further concealment technique is to process the image statistics so that they are the same as the original carrier file. Consequently, the statistics of the carrier file will be almost unchanged and it becomes unlikely that the presence of the steganographic modifications can be detected mathematically.

A subverted employee of an organisation, or software masquerading as such an employee, may use steganography to try to pass sensitive information from inside the organisation's secure logical perimeter to an agent (human or software) outside that perimeter. Conversely, to protect an organisation's security a firewall or other barrier device can be provided to detect and potentially prohibit export of sensitive information. It may also be suspected that steganography is being used to conceal the transfer of sensitive information.

Products are available which attempt to detect instances of steganography, and they rely on statistical properties of images. To assess the effectiveness of these products, tests were carried out using them with a number of data samples: the samples were digitised images in which information was hidden using a range of steganographic tools freely available from the Internet and based on publicly known principles. The samples included one which was an intentionally poor example of steganography. With most data samples, the tests showed that available steganography detection products give too high a false positive rate when their sensitivity settings are set to give an acceptable false negative rate. Here "false positive" means apparent detection of steganography where none exists, and "false negative" means failure to detect an actual instance of steganography. This demonstrates the weakness of techniques that rely on statistical properties of images.

It is known to detect unwanted information in the form of viruses in computer systems using some characteristic or signature that in each case the virus leaves in software or data it has attacked. U.S. Pat. No. 5,649,095 to Cozza discloses detection of a virus from virus-induced change in length of an affected file. Published International Application No. WO 02/103533 mentions use of a signature to detect a virus or other malicious code, but does not disclose how a signature is created.

EP 0896285 A1 makes reference to the use of signatures to detect viruses. It uses signatures to try and increase the chances of detecting both an original virus and variants thereof. WO 02/103533 uses similar techniques to spot malicious software and other so-called "malware". These techniques suffer from the problem that the signature has to be originated by human intervention. That is, once software has been identified as being malicious, a human has to decide upon an appropriate signature for use by antiviral software.

U.S. Pat. No. 5,452,442 to Kephart discloses extraction of virus signatures from source material by an automatic procedure. The procedure is relatively complex: i.e. a computer system implementing this procedure executes the following:
a) obtain virus samples;
b) perform two filtering operations to remove from virus samples all but invariant virus code from which signatures will be obtained;
c) obtain a corpus of programs in common use on the relevant platform (hardware-operating system combination);
d) calculation of exact and partially matching probabilities for candidate signatures using the corpus of programs;
e) combination of exact and partially matching probabilities to obtain an overall score for each candidate signature;
f) selection of a threshold for comparison with candidate signature scores by (i) segregating the corpus of software into probe, training and test sets, (ii) using the probe set to provide trial signatures (byte strings), (iii) using the training set to estimate probabilities of trial signatures; (iv) counting trial signature frequencies in the test set, (v) producing lists of estimated probabilities versus frequency, (vi) determining false positive probabilities, and (vii) determine a threshold having a sufficiently low false positive probability but achieved by an acceptable proportion of trial signatures; and
g) rejection of candidate signatures with overall scores which fail to achieve the threshold.

SUMMARY OF THE INVENTION

It is an object of the present invention to provide an alternative approach to detection of items stored in a computer system.

The present invention provides a computer-implemented method for detection of items stored in a computer system such as computer code, data or information characterised in that it comprises obtaining a signature by reading code comprising at least part of a program capable of introducing the items, the code incorporating sufficient data to characterise the program adequately, using the code as the signature, comparing the signature with files stored on the computer system, and, if a match with the signature is found, providing an indication thereof.

The invention provides the advantage that it is a means for detection of unwanted items that does not rely on analysing statistical properties of images and does not require a complex signature generation procedure. The selection of code to provide a signature may therefore be prearranged as regards location in the program. Moreover, examples of the invention have exhibited zero false negatives and negligible false positives.

The indication may incorporate an identification of at least one of:
a) an item responsible for the match,
b) the nature of the item,
c) the item's location in the computer system, and
d) the matching signature.

The items may be unwanted, e.g. steganographic items.

The code of the signature may be one of the following:
a) a continuous sequence of code taken from a program;
b) a continuous sequence of code taken from a program and beginning where that program begins;
c) a continuous sequence of code taken from a program but not more than 5% and not less than 0.167% of that program's code;
d) a kernel of a program;
e) a .DLL or .ocx file; and
f) code implementing both write to and read from a file.

Asserted file type may be ignored when comparing files with the signature. The step of comparing the signature with files may for each file be preceded by checking the respective real file type by reading the start of the file and excluding files having prearranged initial byte sequences from comparison with the signature.

Files not accessible by a system administrator may be excluded from comparison with the signature. Files compared with the signature may include logical wastebasket files, deleted files, compressed files, self-extracting executable files and polymorphic files.

No indication as aforesaid may be given in respect of some prearranged files despite their containing code which matches a signature.

In an alternative aspect, the present invention provides computer apparatus for detection of stored items such as computer code, data or information characterised in that the apparatus is programmed to:
a) obtain a signature by reading code comprising at least part of a program capable of introducing the items, the code incorporating sufficient data to characterise the program adequately,
b) use the code as the signature,
c) compare the signature with files stored on the computer apparatus, and
d) if a match with the signature is found, providing an indication thereof. obtaining a signature, In another aspect, the present invention provides computer software for detection of unwanted items stored in a computer system such as computer code, data or information characterised in that the software contains instructions for controlling computer apparatus to obtain a signature by reading code comprising at least part of a program capable of introducing the items, the code incorporating sufficient data to characterise the program adequately, to use the code as the signature, to compare the signature with files stored on the computer apparatus, and, if a match with the signature is found, to provide an indication thereof.

The computer apparatus and computer software aspects of the invention may have preferred features equivalent to those of the method aspect of the invention.

DESCRIPTION OF THE FIGURES

In order that the invention might be more fully understood, embodiments thereof will now be described, by way of example only, with reference to the accompanying drawings, in which.

DETAILED DESCRIPTION OF THE INVENTION

Figure 1:
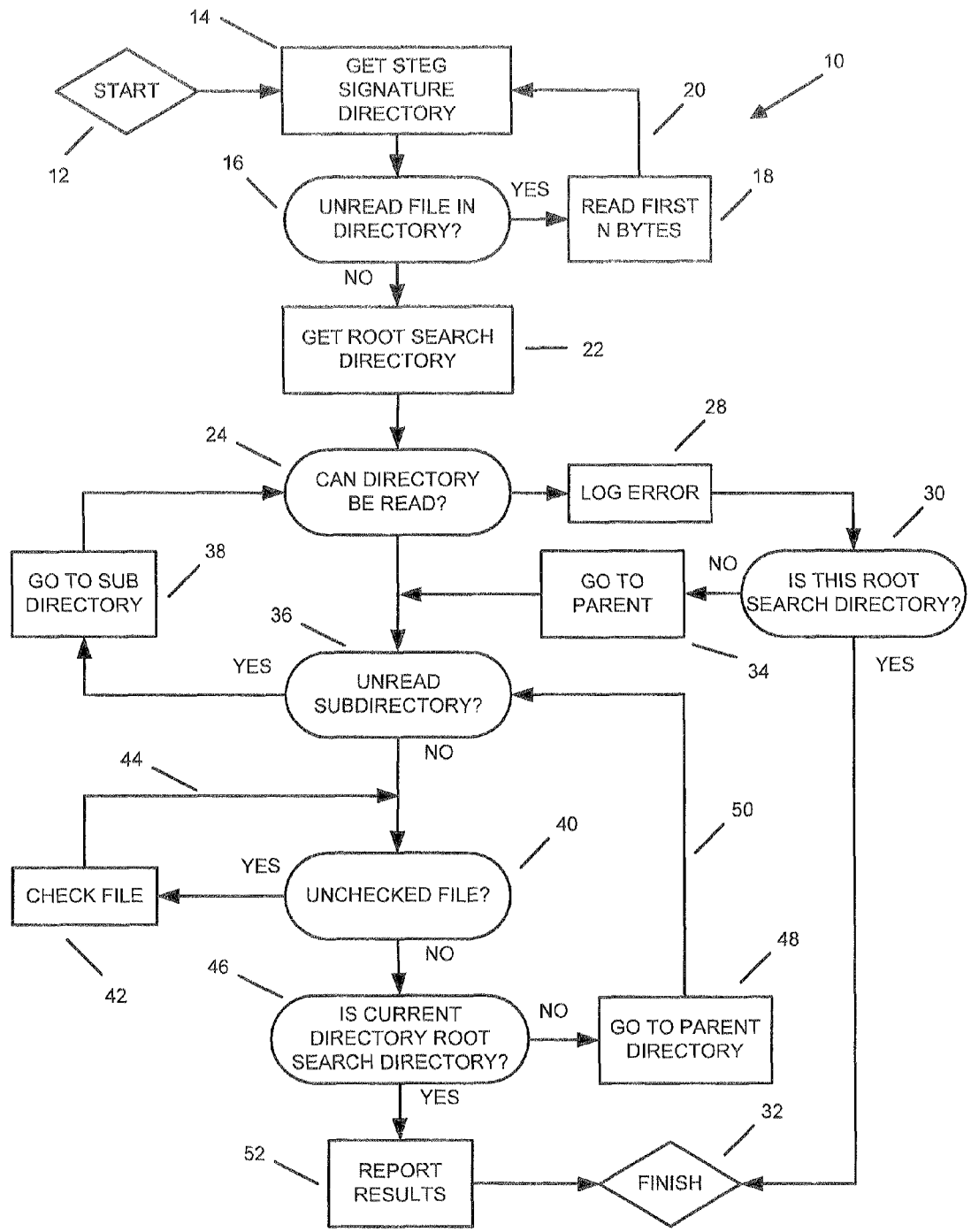
FIG. 1 is a flow diagram of a steganography detection process of the invention.

Referring to FIG. 1, a flow diagram of a steganography detection process 10 of the invention is shown, which is implemented by a computer system (not shown). The computer system starts the process 10 at 12 and obtains a steganographic signature directory at 14 as will be described in more detail later. At 16, a check is made to see if there is any unread file in the directory: if there is such a file, at 18 a sample of length N bytes is read from a prearranged location in the file into a steganographic signature array directory. Here N is a positive integer chosen to be sufficiently large to avoid false positives as far as practically possible, and sufficiently small to allow the process 10 to detect use of variants of a steganographic program. In this example N was 500. In this example the prearranged location of the N byte sample is the beginning of the file. The computer system then iterates around steps 16 and 18 via a loop 20 until all files in the steganographic signature directory have been read and have provided respective N byte samples for the steganographic signature array directory. Each N byte sample of program code is used without alteration as the signature for a respective steganographic program. This is a particularly simple way of obtaining signatures: it is not necessary to process the files or extract from them in any way other than to read part of each file. It is not essential to read from the start of each file, N successive bytes can be read from anywhere in a file. However, bytes at the beginning of a file are more convenient because they are less likely to change in compilation. It is also possible to use more than one sample from a file, and to have different sample lengths for different files, albeit these options are less convenient.

The computer root search directory is accessed by the computer system at 22 to enable all computer-stored files to be read. At 24 a check is made to see if this directory can be read: if not the error is logged at 28, and a check is made at 30 to see if this directory is actually the root search directory. If it is the root search directory, the process 10 cannot proceed and ends at 32. If it is not the root search directory, at 34 a parent directory of the current directory is obtained and at 36 the parent directory is checked to see whether or not it has an unread subdirectory. The specific steganographic signature directory itself (see 14) is excluded from this procedure. If the parent directory has an unread subdirectory, at 38 the process 10 goes to that directory and it is checked at 24 to see whether or not it can be read. The procedure 24 to 38 then iterates until either the process 10 has ended at 32 or all readable subdirectories in the parent directory have been read. If the parent directory has no subdirectory which is unread but readable, at 40 the parent directory is checked to see whether or not it has an unread file. If it has an unread file, at 42 the file is compared with each signature file in the steganographic signature array directory (as will be described later in more detail), and the results of this comparison are stored. The procedure 40, 42 then iterates around a loop 44 until the parent directory has no unread file other than files for which it had been prearranged to exclude from checking for steganography. Excluded files comprise the system paging file and files which a system administrator could not examine: these were excluded to avoid a series of "no access" warnings.

At 46, another check is made at 30 to see if the parent directory is actually the root search directory: if not, a "parent of parent" directory is sought at 48, and via a loop 50 the procedure 24 to 46 iterates until it has either ended at 32 or the current directory has become the root search directory and all files in it have been checked for steganography. The results of checking at 42 are then reported at 52 to a user of the process 10, which then ends at 32. If the results indicate that any computer file contained data matching any steganographic signature, an unauthorised program on the computer being searched would have been identified. Once the unauthorised program is identified, appropriate remedial action can be taken by a computer system administrator.

Figure 2:
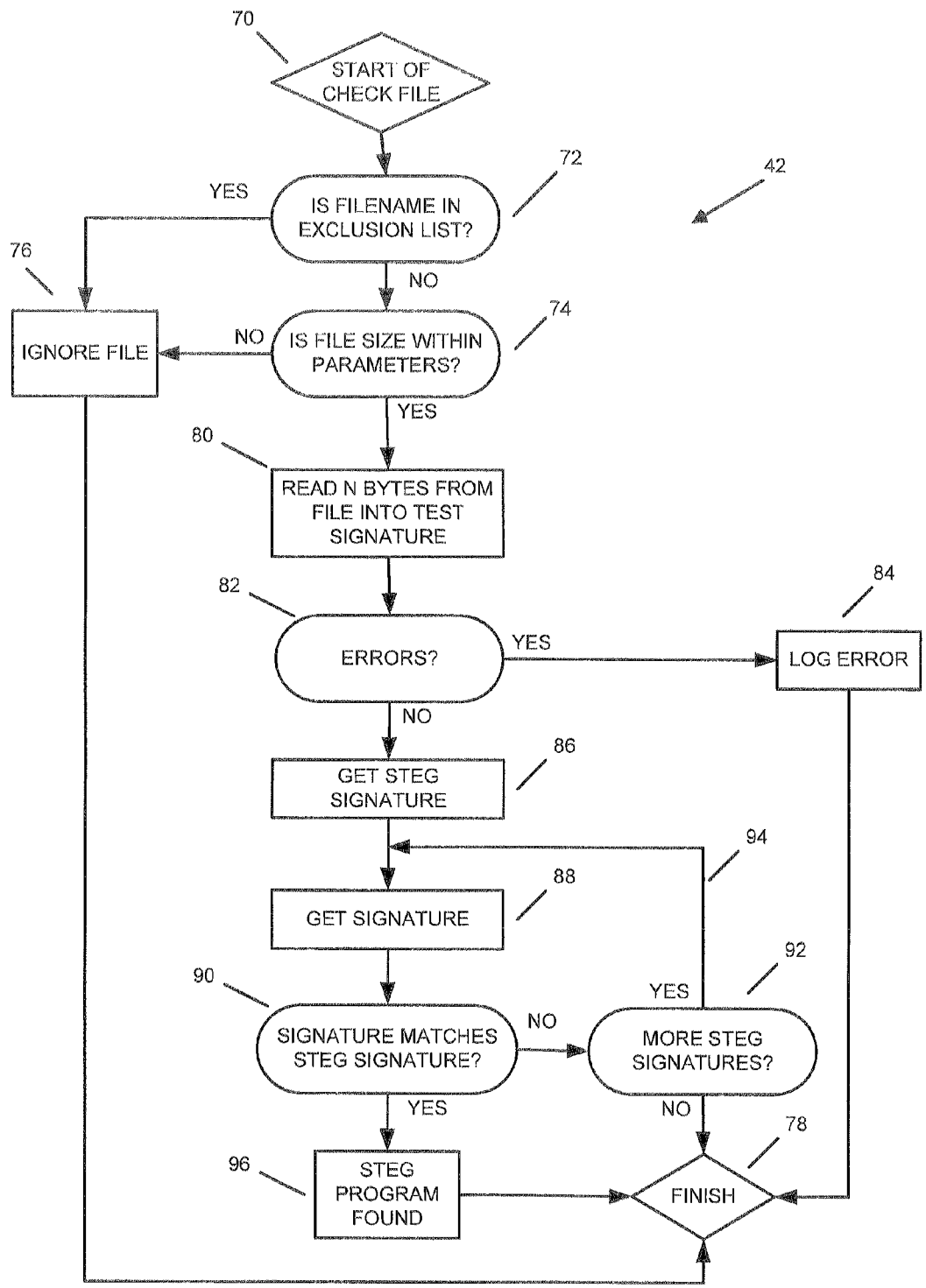
FIG. 2 is a flow diagram of a check file step which is incorporated in the FIG. 1 process.

Referring now to FIG. 2, the check file step 42 is shown in more detail. It starts at 70, and at 72 and 74 respectively it checks whether or not the filename is on an exclusion list and need not be checked and file size is in accordance with predefined limits. If either the filename is on the exclusion list, or file size is not in accordance with predefined limits, at 76 the file is ignored and the check file step 42 ends at 78. If the filename is not on the exclusion list, and also file size is in accordance with predefined limits, then at 80 a sample of length N bytes is read from that file into a test signature file: as has been said it is preferably the first N bytes of the file which is read. A check is made at 82 for errors in this read process, and if there was an error the error is logged at 84 and the check file step 42 ends at 78. If there were no read errors, the steganographic signature array directory (see step 18 in FIG. 1) is obtained at 86 and a steganographic signature is chosen from it at 88 to compare with the test signature in the file obtained at 80. This comparison is carried out at 90. If the steganographic signature does not match the test signature, at 92 a check is made to see whether or not there are any more signatures in the steganographic signature array directory. If there are any more signatures, via a loop 94 the procedure of steps 88, 90 and 92 iterates while steganography remains undetected until there are no more steganographic signatures left for comparison, in which case the check file step 42 ends at 78. If the steganographic signature does in fact match the test signature at 90, then at 96 the filename, the finding of steganography in it, the file location and the matched signature are recorded as results for reporting at 52 in FIG. 1. The check file step 42 then ends at 78 until a new file is selected for checking at 40 and the step 42 iterates once more. Files identified as adulterated by steganography may be deleted or removed for investigation.

The steganographic signature directory at 14 was obtained by assembling a series of steganographic programs (two in the present example), these being programs which implement steganography as opposed to software, imagery or data which have become afflicted by it. Candidate steganographic programs were required to have at least 10,000 bytes and not more than 300,000 bytes, so N equal to 500 means that the signature represents not more than 5% and not less than 0.167% of the program it is taken from.

It is straightforward to obtain copies of most or all publicly available steganographic programs, as they are available free or obtainable by purchase, often from the Internet. In order to derive steganographic signatures, an important file in each of these steganographic programs was identified and chosen: wherever possible, this chosen file was the program's core steganographic kernel. For example, a steganographic program may comprise an ".exe" (execute) file to provide a computer user interface, and a ".DLL" (dynamically linked library) file to perform a computationally intensive computation when called by the .exe file. For such a program, the .DLL file was chosen to provide the N byte sample at 18 as it is liable to be smaller than the .exe file and more importantly less liable to be changed. A .DLL file is often a file which implements a mathematical function, and its kernel is that part of it which is essential to implement that function. Choosing a .DLL file also means that attempts to write a new steganographic program using it would also be detected. It is best if the N byte sample is completely unique to the steganographic program to avoid false positives, and a .DLL file is more likely to be unique than an .exe file. Another possibility is a .ocx file which is similar to a .DLL file except that it has a different interface.

Once the chosen files were identified, they were put into a specific steganographic signature directory containing no other files. Access to this directory was banned to all users except administrators: this access control is available using well-known computer operating system facilities. The software tool which implements the process 10 when running on a computer system automatically takes the first N bytes of each chosen file as the respective steganographic signature. Each signature was then available for comparison with computer files at 90. The computer implementing the process 10 then compared these signatures with all files on its hard disk, apart from those in the specific steganographic signature directory itself and those on a prearranged exclusion list.

It was found that a wide range of values for "N" could be used for which no false positives occurred. Because all files on a computer hard disk other than the signature directory and those on the exclusion list are compared with steganographic signatures, a user of the process 10 can be confident that all steganographically modified files will be identified for which there were steganographic signatures in the signature directory obtained at 14.

The invention may alternatively be carried out by comparing each steganographic signature with each computer file asserted to be an executable file by an .exe suffix. This reduces processing time. However, it is preferable to ignore the asserted file type when performing the process 10, in order to defeat attempts to hide unwanted steganographic software by changing the asserted file type. Moreover, it is possible to discern the real file type by reading the start of the file, and those files that start with initial byte sequences of known image and sound types can be eliminated from comparison in the process 10. The process 10 may be further enhanced by looking inside logical wastebasket files such as those found in common personal computers, or for deleted files to see if any steganographic files have been present on a computer in the past. It may be used with compressed files such as Zip files, cabinet files and TAR files. It may be used to look for self-extracting executable files and polymorphic files, in ways that are analogous to those used to detect some classes of computer virus.

The process of the invention may be speeded up by performing some tests more frequently than others. Alternatively or additionally, whenever a program is to be executed, a check may first be made that the program does not have a steganographic signature before it starts to execute. This check can be combined with a virus checking program, giving the possibility of a reduced time needed to perform both types of check. The checks may be made on all or some of the computers on a computer network The steganographic signature may be an entire steganographic program, or as previously described it may be a subset of the program code such as the first N bytes of its kernel. Such a subset is a template indicating the relevant steganographic program. One advantage of the use of a template is that it may be faster for a computer to perform the process 10. A second advantage is that variants of a particular steganographic program may retain the template unchanged, which means that the variants need not be checked individually with different templates. A further advantage is that if a new version of a steganographic program is produced, there is a possibility that the template for the previous version may appear in the new version. This makes it possible that new unknown variants of steganographic software may be detected by means of the process 10. The signature or template should be sufficiently long, i.e. should contain a sufficient number of bytes, to characterise the steganographic program adequately to avoid significant numbers of false positives. It needs fewer bytes if it incorporates something highly specific to the steganographic program such as its kernel.

Although the invention has been described in terms of image carrier files and steganographic programs, it can be used for other types of carrier file and other types of items, i.e. computer code, data or information. It may for example be used to detect items that are not unwanted, e.g. to measure how many items of licensed software are in use simultaneously.

The process 10 is a reactive technique, in that it is necessary to obtain sample programs or templates derived from them. An alternative technique is to look for generic signatures. There are only a limited number of standard ways of accessing images in any given operating system. There are even fewer standard ways of writing images back to the computer's storage media. One method of identifying potential steganographic programs is look for programs that contain the necessary software calls to read and write images or other types of carrier file. Any file that contains both read and write software calls is a potential steganographic program. One alternative is to raise an alarm each time that this occurs. However, there some programs that would be difficult to use for steganography, such as Microsoft Paint, which are common on many computer systems. The invention may use one or more white lists of acceptable files, that is files whose presence on a computer system is arranged not to give rise to an indication of such presence even though they contain code which if compared with a signature would indicate steganography. This avoids false positives arising from for example files such as graphics editors which contain both read and write software calls indicating a potential steganographic program, but which are not in fact actual steganographic programs.

The example 10 of a process of the invention was described for a situation where only what is referred to as a "logical hard disc" would be searched. In this connection, current operating systems may be unable to cope with hard discs of the size currently available, i.e. tens of gigabytes. In this case, a hard disc is divided up into regions (e.g. two gigabyte regions) each treated as a different drive (e.g. A, B, etc. drives) and accessed separately: these regions are referred to as logical hard discs. The process 10 operates only for a logical hard disc currently being accessed. It is possible to adapt the process 10 so that it automatically searches all a computer's logical hard discs, but as described a user must switch from disc to disc manually to do this.

The invention claimed is:

1. A method, comprising:
    locating a steganographic program comprising executable code that includes software calls that introduce steganographic items into a computer file;
    obtaining a steganographic signature by reading a partial section of the executable code;
    identifying, with a processing device, computer files comprising software code, wherein the steganographic program is excluded from the identified computer files;
    obtaining one or more test signatures by reading partial sections of the software code;
    comparing the steganographic signature with the one or more test signatures; and
    displaying, based on said comparing, a listing of which of the computer files comprise software code that has been modified by the steganographic program.

2. The method according to claim 1, wherein the listing includes an identification of a location of the steganographic items in a computer system.

3. The method according to claim 1, wherein the executable code comprises a dynamic link library (DLL) file.

4. The method according to claim 1, wherein certain of the computer files that comprise an asserted file type are excluded when comparing the one or more test signatures with the steganographic signature.

5. The method according to claim 1, further comprising:
    checking a respective real file type by reading a start of the computer files; and
    excluding computer files having prearranged initial byte sequences from the comparison.

6. The method according to claim 1, wherein the computer files comprise deleted files.

7. The method according to claim 1, wherein the computer files comprise self-extracting executable files.

8. The method according to claim 1, wherein some prearranged files are not identified in the listing despite containing software code which matches the steganographic signature.

9. The method according to claim 1, further comprising running a virus checking program while comparing the steganographic signature with the one or more test signatures.

10. The method according to claim 1, wherein the executable code comprises both read and write software calls that introduce the steganographic items.

11. An apparatus comprising a storage device for storing computer files, wherein the apparatus is configured to:
    obtain a steganographic signature by reading a partial section of executable code of a program, wherein the program includes software calls that introduce steganographic items into a computer file;
    identify one or more computer files, other than the program, comprising software code; obtain one or more test signatures by reading partial sections of the software code;
    compare the steganographic signature with the one or more test signatures to identify when a match with the steganographic signature is found; and
    in response to identifying when the match is found, display a listing of which of the one or more computer files has been modified by the program.

12. The apparatus according to claim 11, wherein the listing incorporates an identification of the steganographic signature.

13. The apparatus according to claim 11, wherein the steganographic signature comprises a continuous sequence of the partial section of the executable code.

14. The apparatus according to claim 11, wherein one or more predetermined file types are not compared with the steganographic signature.

15. The apparatus according to claim 14, wherein the one or more predetermined file types comprise a graphic editor.

16. The apparatus according to claim 11, wherein the partial section of the executable code comprises a start of the program, and wherein computer files having prearranged initial byte sequences are excluded from the comparison.

17. The apparatus according to claim 11, wherein computer files not accessible by a system administrator are excluded from the comparison.

18. The apparatus according to claim 11, wherein the one or more computer files comprise logical wastebasket files.

19. The apparatus according to claim 11, wherein the one or more computer files comprise polymorphic files.

20. The apparatus according to claim 11, wherein one or more predetermined files are not indicated despite containing software code which matches the steganographic signature.

21. The apparatus according to claim 11, wherein the apparatus is further configured to analyze the one or more test signatures with a virus checking program in combination with the comparison with the steganographic signature.

22. A non-transitory computer readable medium having stored therein computer readable instructions that, in response to execution by a system, cause the system to perform operations comprising:
   identifying one or more computer files comprising software code;
   obtaining one or more test signatures by reading partial sections of the software code;
   obtaining a steganographic signature by reading executable code comprising part of a steganographic program including software calls that introduce steganographic items into the one or more computer files;
   comparing the steganographic signature with the one or more test signatures, wherein the steganographic program is excluded from said comparing; and
   in response to said comparing, displaying a listing of which of the one or more computer files comprises software code that has been modified by the steganographic program.

23. The non-transitory computer readable medium according to claim 22, wherein the operations further comprise identifying a steganographic item that has been introduced by the steganographic program into the software code.

24. The non-transitory computer readable medium according to claim 22, wherein the steganographic signature comprises a continuous sequence of executable program code but not more than 5% and not less than 0.167% of the steganographic program.

25. The non-transitory computer readable medium according to claim 22, wherein an asserted file type is not compared with the steganographic signature.

26. The non-transitory computer readable medium according to claim 22, wherein the operations further comprise:
   checking a real file type by reading a start of the one or more computer files; and
   excluding computer files having prearranged initial byte sequences from the comparison.

27. The non-transitory computer readable medium according to claim 22, wherein computer files that are not accessible by a system administrator are excluded from the comparison.

28. The non-transitory computer readable medium according to claim 22, wherein the one or more computer files comprise logical wastebasket files.

29. The non-transitory computer readable medium according to claim 22, wherein the operations further comprise displaying the identified one or more computer files, and wherein computer files associated with certain file types are not displayed despite containing software code which matches the steganographic signature.

30. The non-transitory computer readable medium according to claim 22, wherein the operations further comprise executing the one or more computer files, and wherein the comparison is made prior to executing the one or more computer files.

31. The non-transitory computer readable medium according to claim 22, wherein the operations further comprise:
   identifying a plurality of steganographic programs including both read and write software calls that introduce the steganographic items; and
   obtaining a plurality of steganographic signatures associated with the steganographic programs for comparison with the one or more test signatures.

* * * * *

UNITED STATES PATENT AND TRADEMARK OFFICE
CERTIFICATE OF CORRECTION

| | | |
|---|---|---|
| PATENT NO. | : 8,151,117 B2 | Page 1 of 1 |
| APPLICATION NO. | : 10/577660 | |
| DATED | : April 3, 2012 | |
| INVENTOR(S) | : Hicks | |

It is certified that error appears in the above-identified patent and that said Letters Patent is hereby corrected as shown below:

On Page 2, in Field (56), under "OTHER PUBLICATIONS", in Column 2, Line 4, delete "Mcullagh," and insert -- McCullagh, --, therefor.

On Page 2, in Field (56), under "OTHER PUBLICATIONS", in Column 2, Line 4, delete "Wavs"," and insert -- .Wavs", --, therefor.

In Column 2, Line 46, delete "signatures;" and insert -- signatures, --, therefor.

In Column 3, Line 56, delete "thereof." and insert -- thereof, --, therefor.

In Column 3, Line 56, delete "signature," and insert -- signature. --, therefor.

In Column 4, Line 5, delete "DESCRIPTION" and insert -- BRIEF DESCRIPTION --, therefor.

In Column 7, Line 3, delete "network" and insert -- network. --, therefor.

In Column 7, Line 57, delete "example 10 of a process" and insert -- example of a process 10 --, therefor.

In Column 8, Line 26, in Claim 3, delete "(DLL)" and insert -- (.DLL) --, therefor.

Signed and Sealed this
Eighteenth Day of September, 2012

David J. Kappos
*Director of the United States Patent and Trademark Office*